United States Patent
Cho et al.

(10) Patent No.: US 11,812,829 B2
(45) Date of Patent: Nov. 14, 2023

(54) ACCESSORY AND MANUFACTURING METHOD THEREFOR

(71) Applicant: Samsung Electronics Co., Ltd., Gyeonggi-do (KR)

(72) Inventors: Chulin Cho, Gyeonggi-do (KR); Jaebum Kim, Gyeonggi-do (KR); Nokyoung Park, Gyeonggi-do (KR); Hwanjae Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 711 days.

(21) Appl. No.: 16/971,437

(22) PCT Filed: Dec. 10, 2018

(86) PCT No.: PCT/KR2018/015625
§ 371 (c)(1),
(2) Date: Aug. 20, 2020

(87) PCT Pub. No.: WO2019/164109
PCT Pub. Date: Aug. 29, 2019

(65) Prior Publication Data
US 2020/0397106 A1     Dec. 24, 2020

(30) Foreign Application Priority Data
Feb. 23, 2018   (KR) .................... 10-2018-0021990

(51) Int. Cl.
*A45C 11/00*       (2006.01)
*H04B 1/3888*     (2015.01)
(Continued)

(52) U.S. Cl.
CPC ................ *A45C 11/00* (2013.01); *B26F 1/02* (2013.01); *B32B 3/02* (2013.01); *B32B 5/026* (2013.01);
(Continued)

(58) Field of Classification Search
CPC .............. A45C 11/00; A45C 2011/001; A45C 2011/002; A45C 2011/003; B26F 1/02;
(Continued)

(56) References Cited

U.S. PATENT DOCUMENTS 9,300,347 B1 *   3/2016   Coverstone .......... H04B 1/3888
10,542,802 B1 *  1/2020   Brown ...................... A45F 5/00
(Continued)

FOREIGN PATENT DOCUMENTS

KR   10-2008-0097910 A   11/2008
KR   10-2009-0077140 A    7/2009
(Continued)

OTHER PUBLICATIONS

Decision of Grant dated Sep. 26, 2022.

*Primary Examiner* — Brian D Nash
(74) *Attorney, Agent, or Firm* — Cha & Reiter, LLC

(57) ABSTRACT

Various embodiments disclosed in the present document relate to an accessory and a manufacturing method therefor. Various embodiments disclosed in the present document may provide an accessory comprising: a base structure which comprises a plate having a front surface facing in a first direction and a rear surface facing in a second direction opposite to the first direction, and a side member extending from the edge of the plate; a first cover member which at least partially covers the surface, including the rear surface, of the base structure and comprises a first flat portion placed opposite to the rear surface, a first edge portion placed opposite to the outer surface of the side member, and a first hemming portion placed opposite to at least a part of the inner surface of the side member; and a second cover member which at least partially covers the surface, including the front surface, of the base structure and comprises a second flat portion placed opposite to the front surface, and a second edge portion placed opposite to at least a part of the
(Continued)

inner surface of the side member, wherein at least a part of the second edge portion overlaps at least a part of the first hemming portion.

15 Claims, 10 Drawing Sheets

(51) Int. Cl.
  *B26F 1/02*   (2006.01)
  *B32B 3/02*   (2006.01)
  *B32B 5/02*   (2006.01)
  *B32B 27/12*   (2006.01)
  *B32B 27/36*   (2006.01)

(52) U.S. Cl.
  CPC ............ *B32B 27/12* (2013.01); *B32B 27/365* (2013.01); *H04B 1/3888* (2013.01); *A45C 2011/001* (2013.01); *A45C 2011/002* (2013.01); *A45C 2011/003* (2013.01); *B32B 2571/00* (2013.01)

(58) Field of Classification Search
  CPC ........... B32B 3/02; B32B 5/026; B32B 27/12; B32B 27/365; B32B 2571/00; H04B 1/3888
  See application file for complete search history.

(56) References Cited

U.S. PATENT DOCUMENTS

| | | | |
|---|---|---|---|
| 2007/0271669 A1 | 11/2007 | Bansal et al. | |
| 2010/0124040 A1* | 5/2010 | Diebel | H04B 1/3883 361/679.01 |
| 2011/0159324 A1* | 6/2011 | Huang | H01M 50/202 429/7 |
| 2011/0309728 A1* | 12/2011 | Diebel | H04B 1/3888 312/293.1 |
| 2012/0302294 A1* | 11/2012 | Hammond | H04M 1/724092 362/88 |
| 2013/0020229 A1* | 1/2013 | Wyner | G06F 1/1626 206/591 |
| 2014/0055014 A1* | 2/2014 | Pan | H04B 1/3888 312/223.2 |
| 2014/0152890 A1* | 6/2014 | Rayner | A45C 11/00 277/312 |
| 2014/0268519 A1* | 9/2014 | Huang | H04B 1/3888 361/679.01 |
| 2015/0060309 A1 | 3/2015 | Sartee et al. | |
| 2015/0111623 A1* | 4/2015 | Hegemier | B44C 1/105 455/575.1 |
| 2015/0194995 A1* | 7/2015 | Fathollahi | H04B 1/3888 455/575.8 |
| 2016/0058146 A1 | 3/2016 | Baker et al. | |
| 2017/0187853 A1 | 6/2017 | Dukerschein et al. | |
| 2017/0248992 A1 | 8/2017 | Jenkins et al. | |
| 2018/0026223 A1* | 1/2018 | Choi | B32B 27/365 428/76 |
| 2018/0260002 A1* | 9/2018 | Honma | G06F 1/1613 |
| 2018/0366679 A1* | 12/2018 | Kim | B32B 27/10 |
| 2019/0009498 A1* | 1/2019 | Yee | B32B 7/06 |
| 2020/0295795 A1* | 9/2020 | Fathollahi | H04B 1/3888 |

FOREIGN PATENT DOCUMENTS

| KR | 10-2010-0033811 A | 3/2010 |
|---|---|---|
| KR | 10-1084548 B1 | 11/2011 |
| KR | 10-2012-0029546 A | 3/2012 |

* cited by examiner

ACCESSORY AND MANUFACTURING METHOD THEREFOR

CROSS-REFERENCE TO RELATED APPLICATION(S)

This application is a National Phase Entry of PCT International Application No. PCT/KR2018/015625, which was filed on Dec. 10, 2018 and claims priority to Korean Patent Application No. 10-2018-0021990, which was filed on Feb. 23, 2018 in the Korean Intellectual Property Office, the contents of which are incorporated herein by reference.

BACKGROUND

1. Field

Various embodiments disclosed in this document relate to an accessory and a method for manufacturing the same.

2. Description of the Related Art

An electronic device refers to a device configured to perform a specific function according to a program loaded therein, including a home appliance, an electronic wallet, a portable multimedia player, a mobile communication terminal, a tablet PC, an image/sound device, a desktop/laptop computer, and a vehicle navigation system. For example, such electronic devices may output stored information as sounds or images. In line with high degree of integration of electronic devices and widespread use of super-high-speed/large-capacity wireless communication, it has become a recent trend to equip each mobile communication terminal with multiple functions.

An electronic device may have a display disposed on a surface thereof such that a screen may be output according to device operations. Electronic devices, such as the mobile communication terminals, tend to be made thin and light for the purpose of carrying the same. There is a concern that such a portable electronic device may be broken by an external physical impact, and a protective cover surrounding the exterior of the electronic device, for example, may be provided in an accessory type.

SUMMARY

A protective cover, as an accessory surrounding the exterior of an electronic device, may not only provide a function of simply protecting the electronic device, but also have an advantageous effect of evoking an aesthetic appeal to the user.

To this end, various materials such as a hard case, polyurethane, leather, a woven material, a nonwoven fabric, and a knitted material may be used to manufacture accessories, and various materials may be coupled to a single accessory according to some embodiments.

For example, an accessory may be manufactured by combining a card case made of polycarbonate (PC) with a woven material and a knitted material. A woven material refers to a fabric obtained by weaving one or at least two kinds of threads so as to intersect perpendicularly as a warp and a weft. A knitted material refers to a fabric obtained by making loops from a single thread or multiple threads and then weaving adjacent loops forwards/backwards/leftwards/rightwards. The knitted material is used to make sweaters, coats, hats, and the like, and may also be used to make microfiber bedclothes and the like due to its good texture. Accordingly, such a good texture may make the knitted material appropriate as the outer covering element of the surface of an accessory, which frequently contacts human bodies.

For example, if an accessory is manufactured by using a knitted material for the outer covering element of the hard case thereof and using a woven material for the lining thereof, fraying may occur during the cutting process in the case of the knitted material. If the boundary of the outer covering element including the knitted material and the boundary of the lining including the knitted material abut each other, the fraying of the knitted material may be directly exposed to the boundary. Taking the protective cover of a mobile electronic device as an example of the accessory, the boundary between the outer covering element including the knitted material and the lining including the woven material may be formed on a plane of the inner surface of the protective cover. In such a case, the fraying of the knitted material may be exposed to the exterior of the accessory through the space in which the electronic device is mounted, thereby degrading the aesthetic appearance of the product.

According to an embodiment, in connection with a method for manufacturing an accessory by using a knitted material for the outer covering element of the hard case thereof and using a woven material as the lining thereof, the boundary line between the outer covering element and the lining, if formed on the inner surface of the hard case (not on a plane thereof), may lower the visibility such that the fraying is not exposed to the exterior. However, forming the boundary line on the inner surface of the hard case in this manner may increase the level of difficulty of the processing process, compared with forming the boundary line on a plane. For example, a relatively simple cutting process may be used (for example, using a tool making straight movements vertically upwards or vertically downwards) to form the boundary line between the outer covering element and the lining on a plane of the hard case, but a more expensive process (for example, flying cut or T-cut) may be necessary to form a boundary line on the inner surface of the hard case. The flying cut process, which is available to shape the inner surface of a workpiece, may use a tool making movements not only in the horizontal direction, but also in the vertically upward or vertically downward direction. A machine used for the flying cut is capable of moving with a high degree of freedom and thus is available for a process requiring a precise cutting operation, but has a more complicated configuration than a machine required only to move vertically, making it more expensive to manufacture an accessory thereby.

In addition, if a knitted material is used as the fabric, the knitted fabric may be curled up from the cut part, even if the flying cut process capable of a relatively precise operation is used.

Various embodiments disclosed in this document may provide an accessory, an accessory manufacturing method, and the like, wherein degradation of the aesthetic appearance of the product, due to fraying, is prevented.

According to various embodiments disclosed in this document, there may be provided an accessory including a base structure including a plate having a front surface formed to face in a first direction and having a rear surface formed to face in a second direction opposite to the first direction, and a side member extending from a periphery of the plate; a first covering member covering at least a partial surface of the base structure including the rear surface, the first covering member including a first planar element facing the rear surface, a first edge element facing an outside surface of the side member, and a first hemming element facing at least a part of an inside surface of the side member; and a second covering member covering at least a partial surface of the base structure including the front surface, the second covering member including a second planar element facing the front surface and a second edge element facing at least a part of the inside surface of the side member, wherein at least a part of the second edge element is configured to overlap at least a part of the first hemming element.

According to various embodiments disclosed in this document, there may be provided a method for manufacturing an accessory, the method including the processes of: preparing a base structure including a plate and a side member extending from a periphery of the plate, a first covering member made of a knit, and a second covering member made of a material different from the first covering member; covering the base structure by the first covering member such that the first covering member at least partially faces the plate of the base structure, an outside surface of the side member, and an inside surface of the side member; coupling at least a part of the first covering member to the base structure; cutting at least a part of the first covering member; covering the base structure by the second covering member; and coupling at least a part of the second covering member, so as to overlap, to at least a part of the first covering member.

According to various embodiments disclosed in this document, there may be provided an accessory attachable to/detachable from an electronic device, the accessory including: a base structure including a plate having a front surface formed to face in a first direction and having a rear surface formed to face in a second direction opposite to the first direction, and a side member surrounding a space formed such that an electronic device is seated on the front surface; a first covering member covering at least a partial surface of the base structure including the rear surface, the first covering member including a first planar element facing the rear surface, a first edge element facing an outside surface of the side member, and a first hemming element facing at least a part of an inside surface of the side member, and the first covering member being made of a knit; and a second covering member covering at least a partial surface of the base including the front surface, the second covering member including a second planar element facing the front surface and a second edge element formed so as to face at least a part of the inside surface of the side member and to overlap at least a part of the first hemming element, and the second covering member being made of a material different from the first covering member, wherein an opening is formed in the side member so as to correspond to a part on which an input/output device of the electronic device is formed, and a second hemming element is formed integrally with the first covering member so as to face at least a part of the front surface and is positioned to correspond to the second opening, the second hemming element having an end abutting an end of one side of the second planar element.

According to various embodiments disclosed in this document, degradation of the aesthetic appearance of an accessory, due to fraying, may be prevented.

According to various embodiments, the cost and time for processing an accessory, and the like, may be reduced.

DETAILED DESCRIPTION

Figure 1:
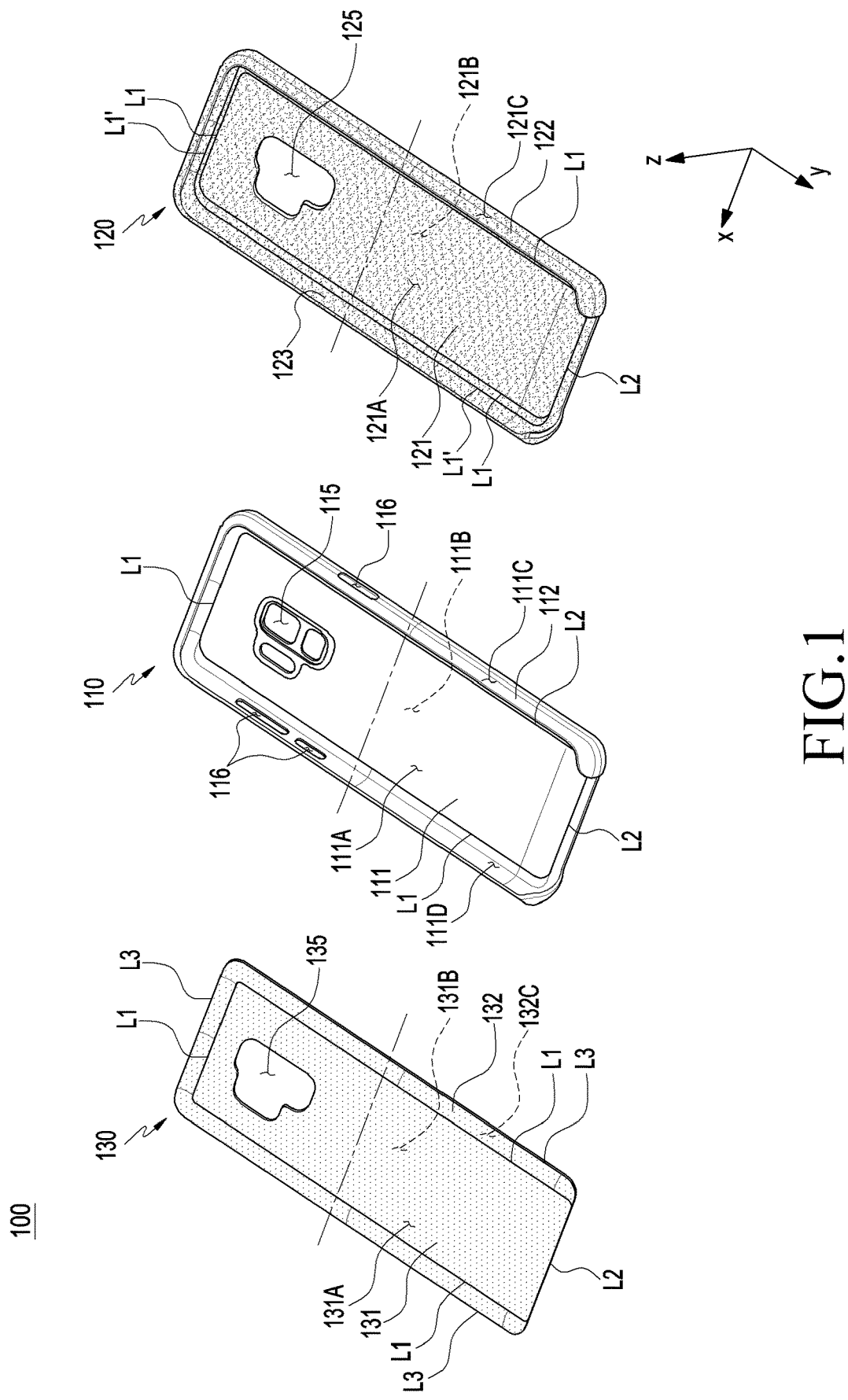
FIG. 1 is an exploded perspective view of an accessory according to various embodiments disclosed in this document.

Hereinafter, various embodiments of the disclosure will be described with reference to the accompanying drawings. However, it should be appreciated that they are not intended to limit the technological features set forth herein to particular embodiments and include various changes, equivalents, and/or alternatives for a corresponding embodiment. With regard to the description of the drawings, similar reference numerals may be used to designate similar or relevant elements. As used herein, the expression "have", "may have", "include", or "may include" refers to the existence of a corresponding feature (e.g., numeral, function, operation, or constituent element such as component) and does not exclude the existence of additional features.

The expressions "a first", "a second", "the first", "the second", and the like as used in various embodiments may modify various elements regardless of the order and/or the importance thereof. These expressions are used merely to distinguish between one element and any other element, and do not limit the corresponding elements. As an example, a first user device and a second user device may indicate different user devices regardless of the order or importance thereof. For example, a first element may be termed a second element, and similarly, a second element may be termed a first element without departing from the scope of the disclosure.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to".

The terms used in the disclosure are only used to describe specific embodiments, and are not intended to limit the disclosure. A singular expression may include a plural expression unless they are definitely different in a context.

Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Figure 2:
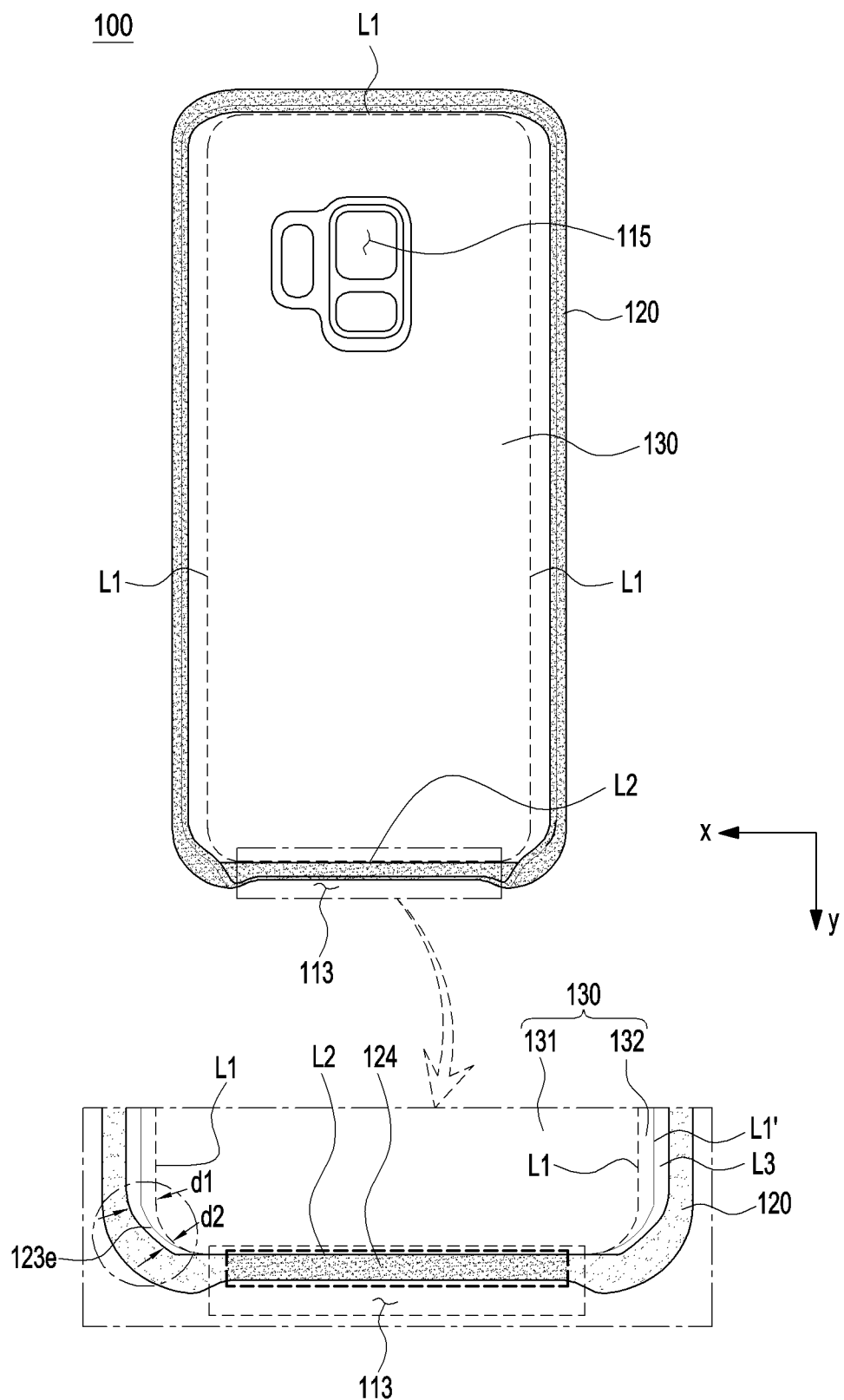
FIG. 2 is a front view of an accessory according to various embodiments disclosed in this document.
Figure 3:
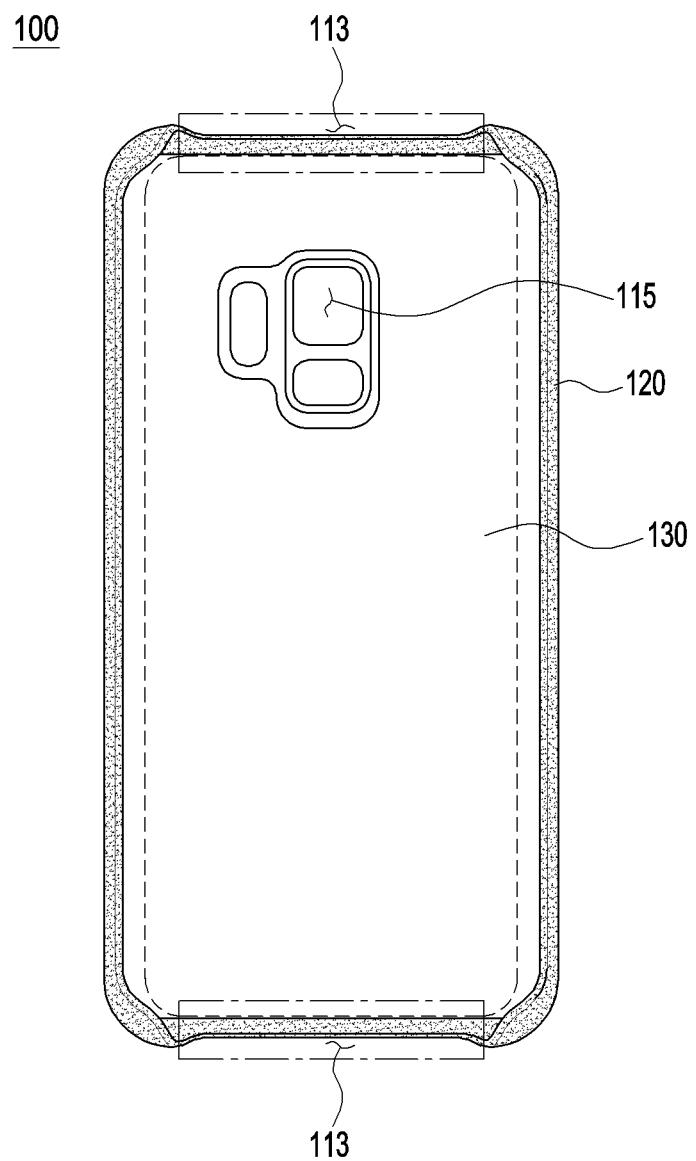
FIG. 3 is a front view of an accessory according to an embodiment disclosed in this document.

FIG. 1 is an exploded perspective view of an accessory 100 according to various embodiments disclosed in this document. FIG. 2 is a front view of an accessory 100 according to various embodiments disclosed in this document. FIG. 3 is a front view of an accessory 100 according to various embodiments disclosed in this document.

Referring to FIG. 1 and FIG. 2 together, the accessory 100 according to various embodiments disclosed in this document may include a base structure 110, a first covering member 120 as an outer covering element, and a second covering member 130 as a lining.

According to various embodiments, the base structure 110 may include a plate 111 having a front surface 111A formed to face in a first direction and having a rear surface 111B formed to face in a second direction opposite to the first direction, and a side member 112 extending from a periphery of the plate 111. In connection with direction components illustrated in FIG. 1 and FIG. 2, in the drawings according to various embodiments disclosed in this document, direction components x, y, and z may refer to corresponding reference directions of a rectangular coordinate system in a space. According to various embodiments disclosed in this document, the first direction may refer to a direction parallel to the direction indicated by direction component z, and the second direction may refer to a direction parallel to the direction opposite to the direction indicated by direction component z.

The base structure 110 may constitute the basic framework of the accessory 100. As the material of the base structure 110, a hard material such as polycarbonate (PC) may be used, for example. The plate 111 may constitute the base of the base structure 110, and the side member 112 may extend from a periphery of the plate 111 in an approximately perpendicular direction. The side member 112 may face in a direction approximately perpendicular to the plate 111, and may have a partially bent shape. The side member 112 may include a side surface facing in a direction different from those of the front surface 111A and the rear surface 111B, and the side surface may include an outside surface 111C facing the exterior of the base structure 110, and an inside surface 110D. According to various embodiments, the plate 111 and the side member 112 may be implemented integrally or separately.

According to various embodiments, the first covering member 120 may cover at least a partial surface of the base structure 110, including the rear surface 111B of the plate 111. The first covering member 120 may include a first planar element 121, a first edge element 122, and a first hemming element 123. According to an embodiment, when the first covering member 120 surrounds the base structure 110, the first planar element 121 may face the rear surface 111B of the plate 111, the first edge element 122 may face the outside surface 111C of the side member 112, and the first hemming element 123 may face the inside surface 111D of the side member 112.

According to various embodiments, the first covering member 120 may be made of a fiber including a knit. The first covering member 120, including a fiber in this manner, may bend flexibly during an accessory manufacturing process so as to surround the base structure 110.

The first planar element 121 in FIG. 1 may be a part of the first covering member 120, which is parallel to the plate 111, when the first covering member 120 surrounds the outside of the base structure 110. According to an embodiment, the front surface 121A of the first planar element 121 may face the rear surface 111B of the plate 111.

According to various embodiments, the first edge element 122 may be a part formed to integrally extend from the first planar element 121, thereby surrounding the outside surface 111C of the side member 112. According to various embodiments, the first hemming element 123 may be a part formed to integrally extend from the first edge element 122 such that the same bends at an end of the side member 112 and faces the inside surface 111D of the side member 112. According to an embodiment, the first edge element 122 and the first hemming element 123 may also surround a fiber including a knit, and thus may flexibly bend and surround the side member 112 during an accessory manufacturing process.

According to various embodiments, the second covering member 130 may cover at least a partial surface of the base structure 110, including the front surface 111A of the plate 111. The second covering member 130 may include a second planar element 131 and a second edge element 132. According to an embodiment, when the second covering member 130 surrounds the base structure 110, the second planar element 131 may face the front surface 111A of the plate 111, and the second edge element 132 may face the inside surface 111D of the side member 112.

According to various embodiments, the second covering member 130 may include a material different from that of the first covering member 120. For example, the first covering member 120 may be made of a fiber including a knit, and the second covering member 130 may be made of a different material, such as a woven material, a nonwoven fabric, or polyurethane. According to an embodiment, the second covering member 130 may be used as a lining that covers the inside of the base structure 110, and a normal woven material may be used therefor, unlike the first covering member 120, in terms of cost saving. According to an embodiment, the second covering member 130 may include a flexible material, and thus may flexibly bend and surround the base structure 110 during an accessory manufacturing process.

The second planar element 131 in FIG. 1 may refer to a part that becomes parallel to the plate 111 when the second covering member 130 surrounds the inside of the base structure 110. The rear surface 131B of the second planar element 131 may then face the front surface 111A of the plate 111.

According to various embodiments, the second edge element 132 may be formed to integrally extend from the second planar element 131, and one surface 132C of the second edge element 132 may face at least a part of the inside surface 111D of the side member 112. According to an embodiment, the second edge element 132 may also include a flexible material and thus may flexibly bend and surround at least a part of the inside surface 111D of the side member 112 during an accessory manufacturing process.

The first hemming element 123 of the accessory 100 according to various embodiments disclosed in this document may be formed such that at least a part thereof is overlapped by at least a part of the second edge element 132.

According to various embodiments, the first hemming element 123 and the second edge element 132 may be formed, with reference to the side member 112, in such a structure that a least a part of the second edge element 132 is overlapped above at least a part of the first hemming element 123 on the inside surface of the side member 112 (hereinafter, referred to as "overlap structure (or stacking structure)"). In the overlap structure, when the side member 112 is seen across a section thereof, an end of the first hemming element 123 and an end of the second edge element 132 may have different heights (or interfaces or levels).

According to various embodiments disclosed in this document, the first hemming element 123 may be made of a fiber including a knit, and the second edge element 132 may be made of a material other than the knit.

When the accessory 100 according to various embodiments disclosed in this document is seen from the outside, the overlap structure is formed on the inside surface 111D of the side member 112, and the boundary line between the first covering member 120 including a knit and the second covering member 130 including a material other than the knit may accordingly be positioned on the inside surface 111D of the side member 112. As a result, when the accessory 100 is seen from the front as illustrated in FIG. 2, the boundary line between the first hemming element 123 and the second edge element 132 is not seen, thereby preventing degradation of the aesthetic appearance of the product due to fraying. According to various embodiments, when the side member 112 is curved, the boundary line between the first hemming element 123 and the second edge element 132 may be additionally covered in an advantageous manner.

In order to remove the fraying that occurs when a knit is used, and additional heat treatment process and/or a precise processing process may be performed. If a boundary line of the first hemming element 123 is formed on the inside surface 111D of the side member 112, it is difficult to perform a heat treatment process and/or a precise processing process, compared with a boundary line formed on a plane.

According to various embodiments disclosed in this document, using the overlap structure, an end of the first hemming element 123 including a knit may be covered by the second edge element 132 including a material other than the knit. As a result, even if partial fraying of the first hemming element 123 occurs, the same may be covered during an accessory manufacturing process, and it may thus be unnecessary to perform an additional heat treatment process and/or a precise processing process in order to remove the fraying.

According to various embodiments, the second covering member 130 may be implemented by using a material which is not susceptible to fraying, or which is easy to finish, unlike the knit, and an end of the second edge element 132 may be evenly cut and used to cover an end of the first hemming element 123, thereby allowing only the precisely processed part to be seen from the outside of the product. This may guarantee that, even if the accessory 100 is implemented by using a knit, degradation of the aesthetic appearance thereof, due to fraying that occurs during the knit cutting process and is exposed to the exterior of the product, is prevented.

According to an embodiment, the second edge element 132 may be compressed and fixed to the first hemming element 123. During a process of coupling the second edge element 132 to the base structure 110, the second edge element 132 may be firmly fixed to the first hemming element 123 on the inside surface of the side member 112.

If the second edge element 132 is coupled to the first hemming element 123 through thermocompression bonding, not only can the product quality be improved even if different materials are used to implement the accessory 100, but design integrity and high durability can also be secured.

Another detailed description of the overlap structure of the first hemming element 123 and the second edge element 132 will be made later with reference to FIG. 4 to FIG. 7.

According to various embodiments, an opening 113 may be formed through one side of the side member 112.

Referring back to FIG. 2, when the accessory 100 is viewed from the front, an opening 113 formed through the lower end of the side member 112 is illustrated. According to various embodiments, the opening 113 may be formed so as to correspond to various input/output devices provided on the housing of the electronic device, such as an ear jack insertion hole and a USB terminal insertion hole. The opening 113 may be modified as desired according to the electronic device mounted on the accessory 100, and thus may be placed in a different position from the position illustrated in the diagram. According to various embodiments, the side member 112 may have multiple openings 113 formed therein.

Referring to FIG. 3, in an embodiment, two openings 113 formed in the side member 112 are illustrated. The two openings 113 may be formed through one side of the side member 112 and the other side thereof, respectively. As illustrated in FIG. 3, the openings 113 may be formed through the upper-end and lower-end parts, when the accessory 100 is seen from the front, but are not necessarily limited thereto.

Referring back to FIG. 2, the accessory 100 according to various embodiments disclosed in this document may provide, as the first covering member 120, a first covering member 120 including a second hemming element 124 which faces at least a part of the front surface 111A, and which is formed in a position corresponding to that of the opening 113.

The second hemming element 124 may be formed on the front surface 111A of the plate 111 so as to face the front surface 111A of the plate 111. For example, the second hemming element 124 may be formed on one side of a periphery of the plate 111. The second hemming element 124 may be provided additionally, unlike the first hemming element 123. The second hemming element 124 may be formed to extend integrally from the first planar element 121, unlike the first hemming element 123 which may be formed to extend integrally from the first edge element 122.

According to various embodiments, an end of one side of the second hemming element 124 may abut an end of one side of the second planar element 131. In addition, according to embodiments, the end of one side of the second hemming element 124 and the end of one side of the second planar element 131 may have the same height, with reference to sections (not illustrated) of the second hemming element 124 and the second planar element 131. Unlike the above-described embodiment in which the first hemming element 123 overlaps the first edge element 122, the second hemming element 124 may have no another component stacked above the second hemming element 124.

Referring to FIG. 2 which is a front view of the accessory 100, the second hemming element 124 may be formed in such a direction that the same is exposed to the exterior, when the accessory 100 is viewed from the front, unlike the first hemming element 123. The second hemming element 124 may be formed in a position corresponding to that of the opening 113, not the inside surface 111D of the side member 112, unlike the first hemming element 123. In such an embodiment, the second hemming element 124 is formed in such a position that processing or heat treatment is more advantageous than the first hemming element 123, thereby enabling more precise processing or heat treatment thereof. Therefore, the second hemming element 124 may be formed in such a state that fraying is minimized, compared with the first hemming element 123, and may minimize degradation of the aesthetic appeal even when formed to abut the second planar element 131.

Hereinafter, the above-described embodiments may be described briefly by using multiple exemplary lines.

Referring to FIG. 1 to FIG. 3, as various embodiments, exemplary lines distinguishing boundaries between components may be illustrated. For example, in the case of the base structure 110, the boundary between the plate 111 and the side member 112 may be denoted by a first line L1. In the case of the first covering member 120, the boundary between the first planar element 121 and the first edge element 122 may be denoted by a first line L1, and in the case of the second covering member 130, the boundary between the second planar element 131 and the second edge element 132 may also be de noted by a first line L1. As another example, the first hemming element 123 of the first covering member 120 may have an end formed on a first line L1 or a $(1-1)^{th}$ line L1', and the second hemming element 124 of the first covering member 120 may have an end formed on a second line L2. As another example, the second edge element 132 of the second covering member 130 may be a part corresponding to a region between a first line L1 and a third line L3. According to various embodiments, the interval between the first line L1 and the third line L3, which is formed by an end of the second edge element 132, may be formed to have a longer width than the interval between the first line L1 and the $(1-1)^{th}$ line L1' such that the second edge element 132 overlaps the first hemming element 123. According to another embodiment, on the second line L2, the end of the second hemming element 124 may abut the end of the second of the second planar element 131. It is to be noted that the above-described boundary lines are only examples for facilitating descriptions.

According to various embodiments, the first hemming element 123 may include a corner element 123e covering at least a part of an inside corner of the side member 112, and the corner element 123e may be connected integrally with the second hemming element 124. In addition, according to an embodiment, the width by which the second edge element 132 overlaps the first edge element 122 on the corner element 123e may gradually decrease towards the first hemming element 124. For example, as illustrated in FIG. 2, the width d1 or d2 by which the second edge element 132 overlaps the first edge element 122 on the corner element 123e may show a gradual decrease towards the first hemming element 124.

Figure 4:
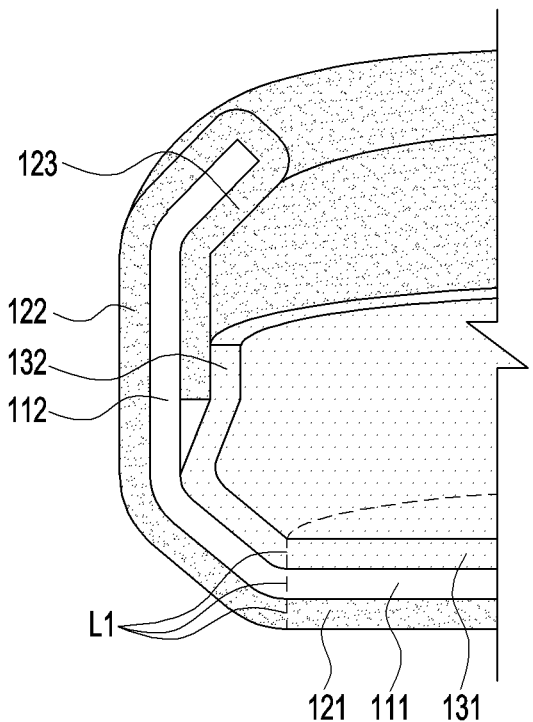
FIG. 4 is a perspective view illustrating a partial section of an accessory according to some embodiments.
Figure 5:
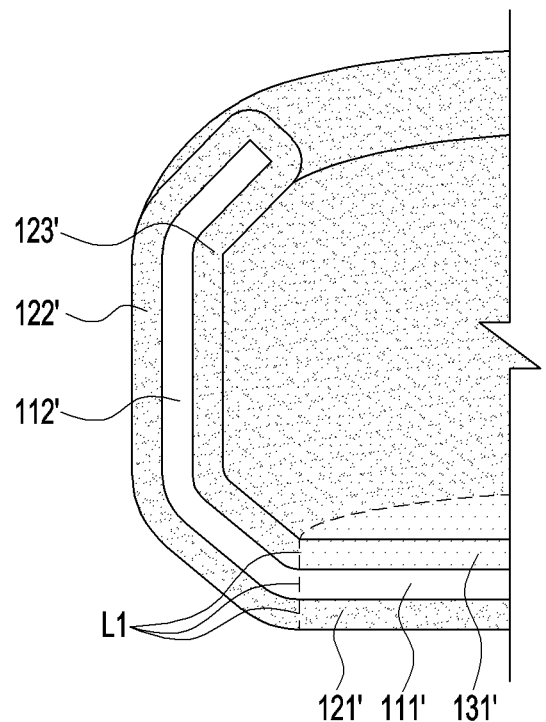
FIG. 5 is a perspective view of the inside surface of the accessory illustrated in FIG. 4.
Figure 6:
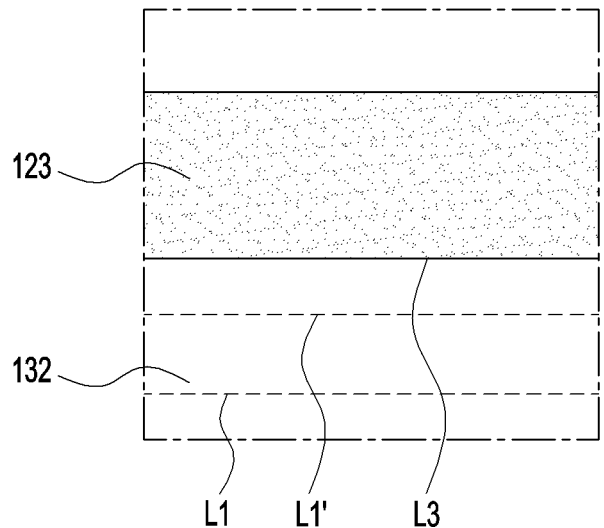
FIG. 6 is a perspective view illustrating a partial section of an accessory according to various embodiments disclosed in this document.
Figure 7:
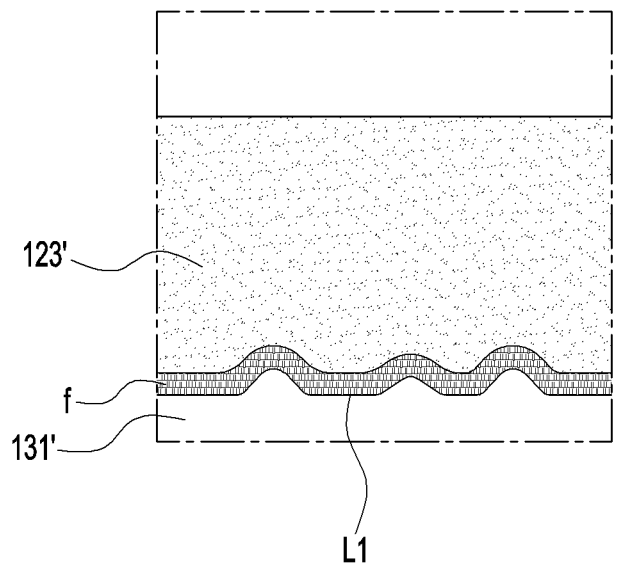
FIG. 7 is a diagram illustrating the inside surface of the accessory illustrated in FIG. 6.

FIG. 4 is a perspective view illustrating a partial section of an accessory according to some embodiments. FIG. 5 is a perspective view of the inside surface of the accessory illustrated in FIG. 4. FIG. 6 is a perspective view illustrating a partial section of an accessory (for example, 100 in FIG. 1) according to various embodiments disclosed in this document. FIG. 7 is a diagram illustrating the inside surface of the accessory (for example, 100 in FIG. 1) illustrated in FIG. 6. According to various embodiments disclosed in this document, the accessory 100 may have an overlap structure formed as illustrated in FIG. 6 and FIG. 7. As a comparative embodiment regarding the same, FIG. 4 and FIG. 5 may be illustrated.

Referring to FIG. 4, an end of the second planar element 131' may be illustrated as abutting an end of the first hemming element 123'. The first covering member in this case may meet the second covering member on a plane of the base structure. As a result, the boundary line may be more easily exposed to the exterior of the product. Therefore, if fraying occurs on the end of the first hemming element 123', the aesthetic appearance of the product may be degraded. Referring to FIG. 5, an end of the second planar element 131' may be illustrated as abutting an end of the first hemming element 123'. As described above with reference to FIG. 4, the fraying f on the end of the first hemming element 123' may be easily exposed to the exterior along the boundary line.

Referring to FIG. 6, the second edge element 132 may overlap the first hemming element 123. Since the overlap structure is disposed on the inside surface of the side member 112, the boundary line may not be easily seen, when the accessory 100 is seen from the outside. The side member 112, if bent as illustrated in FIG. 6, may further hide the boundary line in an advantageous manner. Referring to FIG. 7, the view of the inside surface of the accessory (for example, 100 in FIG. 1), that is, the inside surface of the side member (for example, 112 in FIG. 1) is illustrated. According to various embodiments, the first hemming element 123 may be covering the inside surface of the side member 112, and, in this state, the second edge element 132 may overlap the first hemming element 123. The second edge element 132 may have an end formed along a third line L3, and the first hemming element 123 may have an end formed along a first line L1 or a $(1-1)^{th}$ line L1'. This may accordingly form a structure in which at least a part of the first hemming element 123 is overlapped by at least a part of the second edge element 132. As a result, even if fraying (for example, f in FIG. 5) occurs on the end of the first hemming element 123, the same may be covered by the second edge element 132 without being exposed to the exterior.

Figure 8:
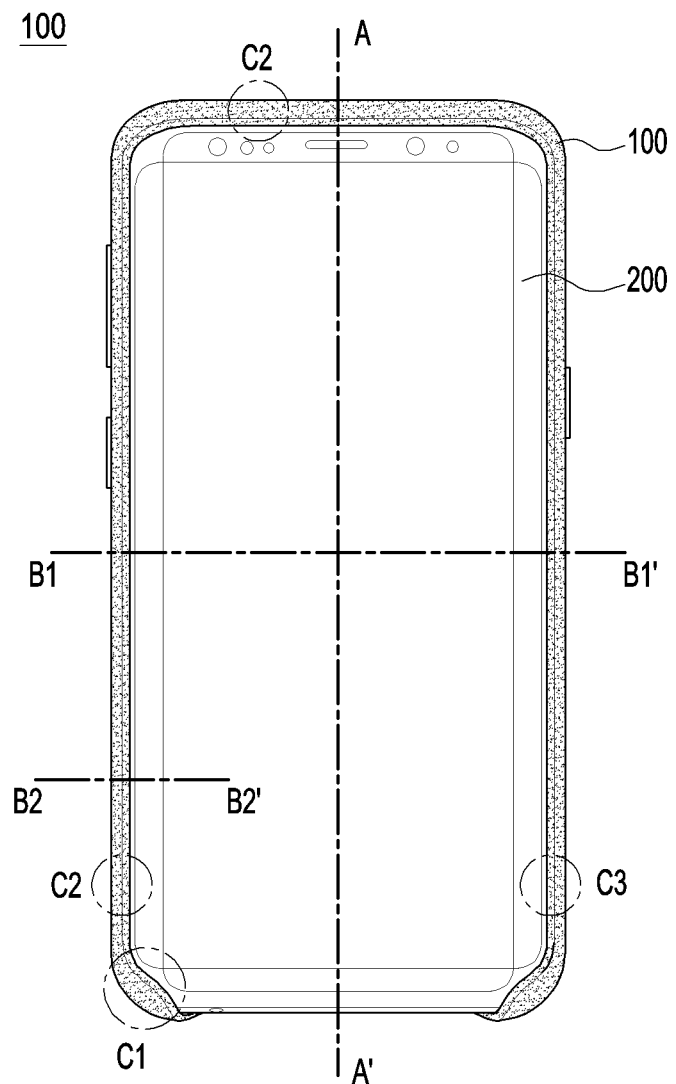
FIG. 8 is a front view of an accessory according to various embodiments disclosed in this document, to which an electronic device is coupled.
Figure 9A:
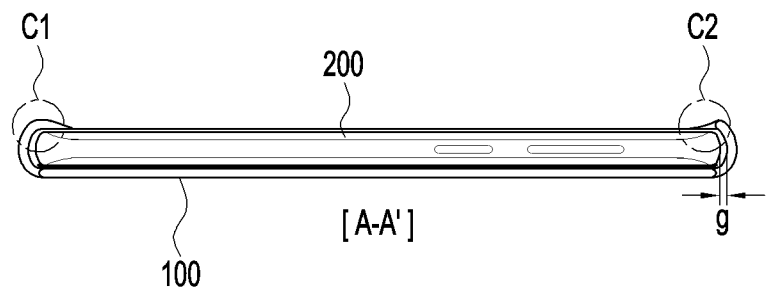
FIG. 9 is a sectional view of an accessory according to various embodiments disclosed in this document, to which an electronic device is coupled.
Figure 9B:
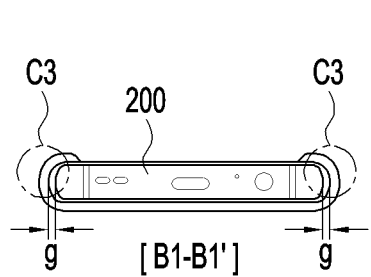
Figure 9C:
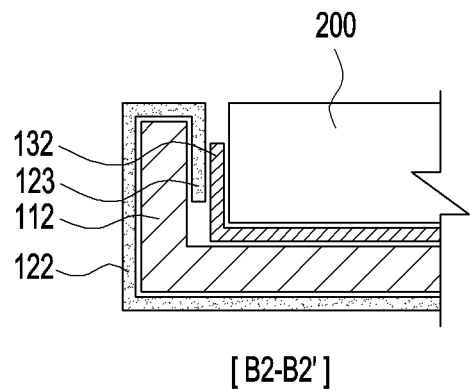

FIG. 8 is a front view of an accessory 100 according to various embodiments disclosed in this document, to which an electronic device 200 is coupled. FIG. 9 is a sectional view of an accessory 100 according to various embodiments disclosed in this document, to which an electronic device 200 is coupled. FIG. 9A may illustrate section A-A' in FIG. 8, FIG. 9B may illustrate section B1-B1' in FIG. 8, and FIG. 9C may illustrate section B2-B2' in FIG. 8.

According to various embodiments, various types of electronic devices 200 may be mounted on an accessory 100 according to various embodiments disclosed in this document.

Various types of devices may correspond to the electronic device 200. The electronic device may include, for example, at least one of a portable communication device (for example, smartphone), a tablet personal computer, a mobile phone, a video telephone, an e-book reader, a desktop personal computer, a laptop personal computer, a netbook computer, a workstation, a server, a personal digital assistant (PDA), a portable multimedia player (PMP), and MP3 player, a mobile medical device, a camera, or a wearable device. According to various embodiments, the wearable device may include at least one of an accessory-type device (for example, watch, ring, bracelet, ankle bracelet, necklace, glasses, contact lenses, or head-mounted device (HMD)), a woven material or garment-integrated device (for example, electronic clothes), a body-attached device (for example, skin pad or tattoo), or a bio-implantable device (for example, implantable circuit).

FIG. 9C conceptually illustrates a part of a section of an accessory 100 on which an electronic device 200 is mounted. Referring to FIG. 9C, starting from the center of the electronic device 200, a second edge element 132, a first hemming element 123, a side member 112, and a first edge element 122 may be disposed successively.

Referring to FIG. 9C and FIG. 4 together, in the case of a second edge element 132 formed to integrally extend from a second planar element (for example, 131 in FIG. 1), the second edge element 132 may partially bent so as to correspond to the shape of the inside surface 111D of the side member 112 and that of the first hemming element 123. At least a part of the second edge element 132 may overlap the first hemming element 123.

According to various embodiments, a gap g may be formed between the accessory 100 and the electronic device 200, due to the thickness of the overlap structure (or stacking structure) of the first hemming element 123 and the second edge element 132. Referring to FIG. 9A and FIG. 9B, the accessory 100 and the electronic device 200 may be coupled face to face on a part on which the gap g is not formed, for example, on an end of the side member (for example, 112 in FIG. 1) and on the boundary part between the side member (for example, 112 in FIG. 1) and the plate (for example, 111 in FIG. 1).

According to various embodiments disclosed in this document, the side member 112 may be curved as a whole so as to compensate for the gap g. According to an embodiment, referring to FIG. 8 and FIG. 9 together, the side member 112 may have fastening regions C1, C2, and C3 formed on an end thereof so as to make face-to-face contact with the electronic device 200. According to various embodiments, the fastening regions C1, C2, and C3 may bend so as to have the same angle, respectively, or may bend so as to have different angles. The bending angle of the fastening regions C1, C2, and C3 may be designated according to a parameter such as the size or position of the gap g or the size or position of the opening (for example, 113 in FIG. 2).

The plate hole (for example, 110 in FIG. 1) may be a hole, for example, through which a camera or various kinds of sensors (for example, proximity sensor and fingerprint sensor) are exposed. By providing the plate hole (for example, 110 in FIG. 1), the first hole (for example, 125 in FIG. 1), and the second hole (for example, 135 in FIG. 1), it is possible to determine whether or not the base structure (for example, 110 in FIG. 1), the first covering member (for example, 120 in FIG. 1), and the second covering member (for example, 130 in FIG. 1) are aligned within a predesignated error range during a process of assembling the accessor (for example, 100 in FIG. 1).

According to various other embodiments, the base structure (for example, 110 in FIG. 1) may have a side key hole (for example, 116 in FIG. 1) formed therein. The side key hole (for example, 116 in FIG. 1) may form a recess, in which a side key holding element (or side key input mediation element (not illustrated)) and a side key (not illustrated) may be provided. A side key pattern element (not illustrated) may be formed in a convex type on one side of the first covering member (for example, 120 in FIG. 1) in a shape corresponding to that of the side key. The side key holding element and the side key may be provided separately from the housing of the electronic device 200 or the side key provided inside the housing. These embodiments may be used as auxiliary means of a key input device for facilitating the user's key inputs.

Referring to FIG. 1 to FIG. 9 together, according to various embodiments disclosed in this document, an accessory 100 attachable to/detachable from an electronic device 200 may be provided. According to an embodiment, the electronic device in this case may be a mobile electronic device which has a smaller size than normal home appliance electronic devices, and which can be carried.

The accessory 100 attachable to/detachable from an electronic device 200 may include a base structure 110 including a plate 111 having a front surface 111A formed to face in a first direction and having a rear surface 111B formed to face in a second direction opposite to the first direction, and a side member 112 surrounding a space formed such that an electronic device 200 is seated on the front surface 111A.

According to various embodiments, the accessory 100 attachable to/detachable from an electronic device 200 may further include a first covering member 120 made of a knit, the first covering member 120 including a first planar element 121 covering at least a partial surface of the base structure 110, including the rear surface 111B, and facing the rear surface 111B, a first edge element 122 facing the outside surface 111C of the side member 112, and a first hemming element 123 facing at least a part of the inside surface of the side member 112.

According to various embodiments, the accessory 100 attachable to/detachable from an electronic device 200 may further include a second covering member 130 made of a material different from the first covering member 120, the second covering member 130 including a second planar element 131 covering at least a partial surface of the base structure 110, including the front surface 111A, and facing the front surface 111A, and a second edge element 132 formed so as to face at least a part of the inside surface of the side member 112 and to overlap at least a part of the first hemming element 123.

According to various embodiments, the accessory 100 attachable to/detachable from an electronic device 200 may have an opening 113 formed in the side member 112 so as to correspond to a part on which an input/output device of the electronic device is formed, and may include a second hemming element 124 formed integrally with the first covering member 120 so as to face at least a part of the front surface 111A, the second hemming element 124 being formed in a position corresponding to that of the opening 113 and having an end abutting an end of one side of the second planar element 131.

According to the above-described embodiments, in connection with the accessory 100 attachable to/detachable from an electronic device 200, the first covering member 120 may be made of a knit, and the second covering member 130 may be made of a material other than the knit. At least a part of the second edge element 132 may be formed to overlap at least a part of the first hemming element 123, and the second hemming element 124 may have an end formed to abut an end of one side of the second planar element 131. As a result, in connection with an accessory 100 using a knit, a part that may degrade the aesthetic appearance may be positioned on a side surface of the side member 112, thereby lowering the visibility, and even if fraying of the knit occurs, the same may be covered by the overlap structure. In addition, a part advantageous to processing (for example, second hemming element 124) may adopt a structure in which an end surface of a component and an end surface of another component abut each other (hereinafter, referred to as "1:1 customized structure"), instead of the overlap structure of one component and another component. As a result, in connection with a process of manufacturing an accessory 100, the overlap structure or the 1:1 customized structure may be selected. Therefore, in addition to product quality improvement, it is possible to apply a process tailored to the product structure and the process situation.

In connection with describing the accessory 100 attachable to/detachable from an electronic device 200 disclosed in this document, descriptions overlapping those in the above-described embodiments will be omitted herein.

FIG. 10 is a diagram schematically illustrating process-specific views, in connection with a method for manufacturing an accessory (for example, 100 in FIG. 1) according to various embodiments disclosed in this document. FIG. 11 is a flowchart illustrating a method for manufacturing an accessory (for example, 100 in FIG. 1) according to various embodiments disclosed in this document.

Figure 10A:
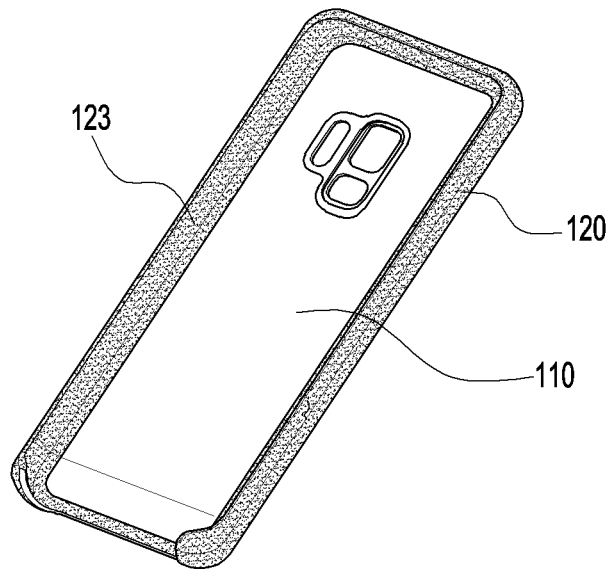
FIG. 10 is a diagram schematically illustrating process-specific views, in connection with a method for manufacturing an accessory according to various embodiments disclosed in this document.
Figure 10B:
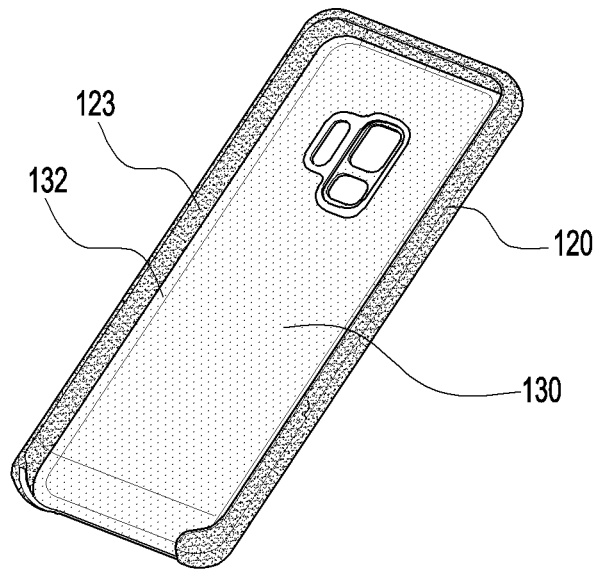
Figure 11:
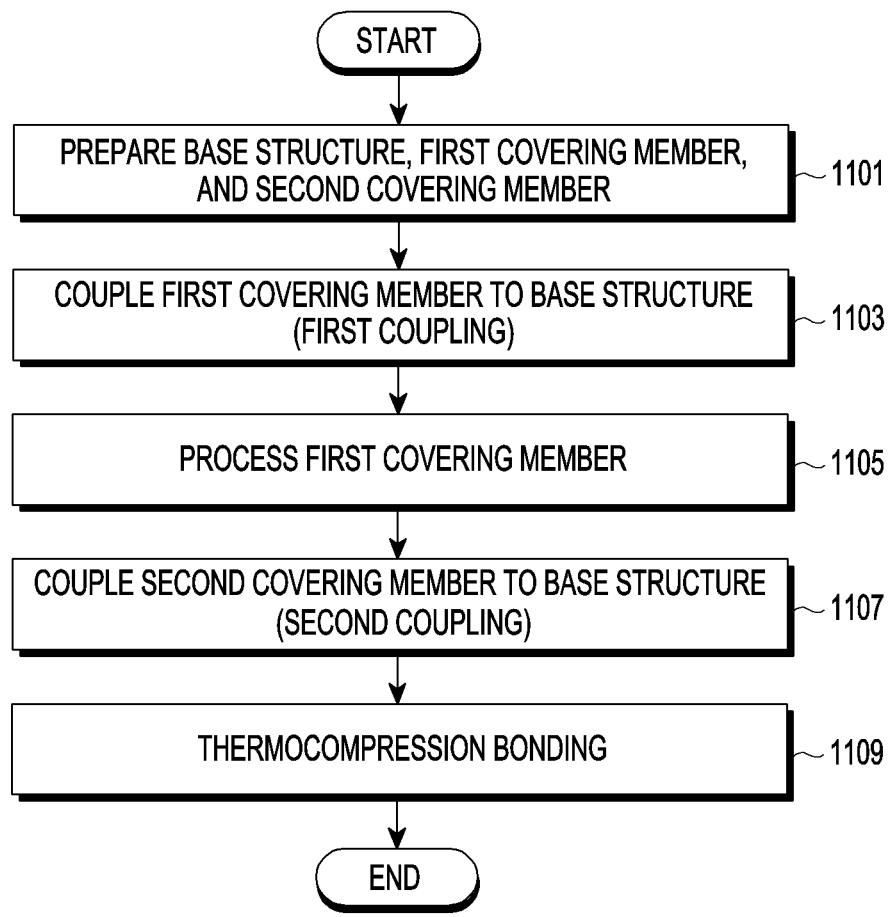
FIG. 11 is a flowchart illustrating a method for manufacturing an accessory according to various embodiments disclosed in this document.

FIG. 10A may illustrate a base structure 110 covered by a first covering member 120, and FIG. 10B may illustrate a base structure 110 covered by a first covering member 120 and additionally covered by a second covering member 130.

Referring to FIG. 10 and FIG. 11 together, a method for manufacturing an accessory 100 according to various embodiments disclosed in this document may include: a preparation process 1101 of preparing a base structure 110, a first covering member 120, and a second covering member 130; a first coupling process 1103 of coupling the first covering member 120 to the base structure 110; a processor 1105 of processing the first covering element 120; and a second coupling process 1107 of coupling the second covering member 130 to the base structure 110. The method for manufacturing an accessory 100 according to various embodiments may also include a thermocompression bonding process 1109 besides the above-mentioned processes.

According to various embodiments, the preparation process 1101 may include a process of preparing a base structure 110 including a plate (for example, 111 in FIG. 1) and a side member (for example, 112 in FIG. 1) extending from a periphery of the plate (for example, 111 in FIG. 1), a first covering member 120 made of a knit, and a second covering member 130 including a material different from the first covering element 120.

The base structure 110 including a plate (for example, 111 in FIG. 1) and a side member (for example, 112 in FIG. 1) may be an injection-molded material obtained by injection-molding a material such as polycarbonate (PC), for example. The first covering member 120 is a fiber material including a knit, for example, and may provide a unique texture to the user. The second covering member 130 is made of a material different from the first covering member 120 including a knit, and may be made of a fiber including a woven or nonwoven fabric, for example, or a material including a nonfibrous material such as polyurethane. Each of the base structure 110, the first covering member 120, and the second covering member 130 may be made of a different material, and the material may be variously modified by considering the processing time of the accessory (for example, 100 in FIG. 1), the processing cost, the material cost, the degree of friction and wear, and the like in a comprehensive manner.

According to various embodiments, the first covering member 120 may constitute the outer covering element of the base structure 110, and the second covering member 130 may constitute the lining of the base structure 110. According to an embodiment, the first covering member 120 may be formed to have a larger size (or area) than the second covering member 130.

According to various embodiments, the first coupling process 1103 may include a process of covering the base structure 110 by the first covering member 120 such that the same at least partially faces the plate (for example, 111 in FIG. 1) of the base structure 110, the outside surface (for example, 111C in FIG. 1) of the side member (for example, 112 in FIG. 1), and the inside surface (for example, 111D in FIG. 1) of the side member (for example, 112 in FIG. 1), and a process of coupling at least a part of the first covering member 120 to the base structure 110.

According to an embodiment, through the first coupling process 1103, the front surface (for example, 121A in FIG. 1) of the first planar element (for example, 121 in FIG. 1) of the first covering member 120 may be made to face the rear surface (for example, 111B in FIG. 1) of the plate (for example, 111 in FIG. 1), the first edge element (for example, 122 in FIG. 1) may be made to face the outside surface (for example, 111C in FIG. 1) of the side member 112, and the first hemming element (for example, 123 in FIG. 1) may be made to face the inside surface (for example, 111D in FIG. 1) of the side member (for example, 112 in FIG. 1). As a result, the first covering member 120 may come to substantially surround the outer surface of the base structure 110.

According to various embodiments, during the first coupling process 1103, "coupling" between each component of the first covering member 120 and each component of the base structure 110 may refer to every physical connection such as conjugation, adhesion, and bonding. For example, "coupling" between each component of the first covering member 120 and each component of the base structure 110 may correspond to thermocompression bonding. According to various embodiments, during the first coupling process 1103, the first planar element (for example, 121 in FIG. 1) of the first covering member 120 may be coupled to the plate (for example, 111 in FIG. 1) by thermocompression bonding, and the first edge element (for example, 122 in FIG. 1) may be coupled to the outside surface (for example, 111C in FIG. 1) of the side member 112 by thermocompression bonding. The first hemming element (for example, 123 in FIG. 1) may be made to face the inside surface (for example, 111D in FIG. 1) of the side member (for example, 112 in FIG. 1).

According to various embodiments, the first coupling process 1103 may include a process of stretching the first covering member 120 such that no gap occurs between the first covering member 120 and the base structure 110, and a process of thermocompression-bonding respective corner parts of the outside surface and inside surface of the base structure 110.

According to various embodiments, the process 1105 of processing the first covering member 120 may include a process of cutting at least a part of the first covering member 120.

According to various embodiments, the process of cutting at least a part of the first covering member 120 may include a process of cutting the first covering member 120 before coupling the same to the base structure 110, and a process of cutting the first covering member 120 after coupling the same to the base structure 110. The process of cutting the first covering member 120 before coupling the same to the base structure 110 may be overlappingly included in the process of preparing the first covering member 120.

According to various embodiments, the process of cutting the first covering member 120 after coupling the same to the base structure 110 may be a process in which the first covering member 120 is cut after being coupled to the base structure 110. For example, after the first covering member 120 is coupled to the base structure 110, at least a part of the first covering member 120 may be press-punched. According to an embodiment, the press punching may refer to processing the form of a product by using a press, and a press-punching process described hereinafter may be a process of punching a product by using a press. The press-punching process may be performed through a predetermined die, and a manufacturing module and a program for driving the die.

According to various embodiments, through the process 1105 of processing the first covering member 120, at least a part of the first covering member 120 may be removed. After coupling the first covering member 120 to the base structure 110, a redundant part may be removed from the first hemming element (for example, 123 in FIG. 1) through the press-punching process. As used herein, the redundant part may refer to a part which is positioned inside the first line (for example, L1 in FIG. 1) on the first hemming element (for example, 123 in FIG. 1), for example, and which abuts the front surface 111A of the base structure 110. Alternatively, the redundant part may refer to a part which is positioned inside the $(1-1)^{th}$ line (for example, L1' in FIG. 1) on the first hemming element (for example, 123 in FIG. 1), and which abuts the front surface 111A of the base structure 110. The press-punching process, during which a die is used to make a linear movement vertically upwards or vertically downwards, may thus be more economical than a flying cut process, for example, and may give a high process yield.

The second coupling process 1107 may include a process of covering the base structure 110 by the second covering member 130, and a process of coupling at least a part of the second covering member 130 to at least a part of the first covering member 120 so as to overlap the same.

According to an embodiment, through the second coupling process 1107, the front surface (for example, 131A in FIG. 1) of the second planar element (for example, 131 in FIG. 1) of the second covering member 130 may be made to face the front surface (for example, 111A in FIG. 1) of the plate (for example, 111 in FIG. 1), and the second edge element (for example, 132 in FIG. 1) may be made to face the inside surface (for example, 111D in FIG. 1) of the side member 112. As a result, the first covering member 120 may come to substantially surround the inner surface of the base structure 110. In this case, at least a part of the second edge element (for example, 132 in FIG. 1) may be coupled to at least a part of the first hemming element (for example, 123 in FIG. 1) so as to overlap the same.

According to various embodiments, during the second coupling process 1107, "coupling" between each component of the second covering member 130 and the base structure 110 may refer to every physical connection such as conjugation, adhesion, and bonding.

Referring back to FIG. 11, the method for manufacturing an accessory (for example, 100 in FIG. 10) according to various embodiments disclosed in this document may include a thermocompression bonding process 1109. According to an embodiment, after the second covering member 130 is coupled to the base structure 110, the coupled components may be fixed through the thermocompression bonding process. In addition, according to an embodiment, no separate thermocompression bonding process may be performed during the above-mentioned first coupling process 1103, and a thermocompression bonding process may be performed in a batch mode after the second coupling process 1107.

According to various embodiments disclosed in this document, the preparation process 1103 may include: a process of forming a plate hole 115 in the base structure 110; a process of forming a first hole 125 in the first covering member 120; and a process of forming a second hole 135 in the second covering member 130. After the plate hole 115, the first hole 125, and the second hole 135 are formed, a process of aligning the plate hole 115 and the first hole 125 may be performed, in connection with the process of coupling at least a part of the first covering member 120 to the base structure 110, and a process of aligning the plate hole 115 and the second hole 135 may be performed, in connection with the process of coupling at least a part of the second covering member 130 to at least a part of the first covering member 120 so as to overlap the same. This may prevent misalignment during the process of coupling the accessory (for example, 100 in FIG. 10) disclosed in this document.

It should be appreciated that various embodiments of this document and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the items, unless the relevant context clearly indicates otherwise. As used herein, each of such phrases as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "$1^{st}$", "$2^{nd}$", "first", or "second" may be used to simply distinguish a corresponding component from another, and does not limit the components in other aspect (for example, importance or order). It is to be understood that if an element (for example, a first element) is referred to, with or without the term "operatively" or "communicatively", as "coupled" or "connected" to another element (for example, a second element), it means that the element may be connected to the other element directly (for example, in a wired manner), wirelessly, or via a third element.

In various embodiments of this document, operations related to a manufacturing method may be performed by using a manufacturing module or a manufacturing program for manufacturing "an accessory or an accessor that can be mounted on an electronic device".

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (for example, a module or a program) of the above-described components may include a single entity or multiple entities. According to various embodiments, one or more of the above-described components or operations may be omitted, or one or more other components or operations may be added. Alternatively or additionally, a plurality of components (for example, modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in this document, an accessory may include: a base structure 110 including a plate 111 having a front surface 111A formed to face in a first direction and having a rear surface 111B formed to face in a second direction opposite to the first direction, and a side member 112 extending from a periphery of the plate 111; a first covering member 120 covering at least a partial surface of the base structure 110 including the rear surface 111B, the first covering member 120 including a first planar element 121 facing the rear surface 111B, a first edge element 122 facing an outside surface of the side member 112, and a first hemming element 123 facing at least a part of an inside surface of the side member 112; and a second covering member 130 covering at least a partial surface of the base structure including the front surface, the second covering member 130 including a second planar element 131 facing the front surface 111A and a second edge element 132 facing at least a part of the inside surface of the side member, wherein at least a part of the second edge element 132 overlaps at least a part of the first hemming element 123.

According to various embodiments, the first covering member 120 may be made of a fiber including a knit.

According to various embodiments, the second covering member 130 may be made of a material different from the first covering member 120.

According to various embodiments, the second edge element 132 may be compressed and fixed to the first hemming element 123.

According to various embodiments, an opening 113 may be formed through one side of the side member 112.

According to various embodiments, multiple openings 113 may be formed through one side of the side member 112.

According to various embodiments, the first covering member 120 may include a second hemming element 124 formed so as to face at least a part of the front surface 111A and positioned to correspond to the opening 113.

According to various embodiments, an end of one side of the second hemming element 124 may abut an end of one side of the second planar element 131.

According to various embodiments, the end of one side of the second hemming element 124 and the end of one side of the second planar element 131 have an identical height.

According to various embodiments, the second hemming element 124 may extend integrally with the first planar element 121.

According to various embodiments, the first hemming element 123 may include a corner element 123e covering at least a part of an inside corner of the side member 112, the corner element 123e may be connected integrally with the second hemming element 124.

According to various embodiments, the width by which the second edge element 132 is overlapped onto the first edge element 122 on the corner element 123e may gradually decrease towards the first hemming element 124.

According to various embodiments, a gap g may be formed between the side member 112 and the second edge element 132.

According to various embodiments, the side member 112 may have an end curved so as to compensate for the gap g.

According to various embodiments, a plate hole 115 may be formed in the base structure, a first hole 125 is formed in the first covering member 120 so as to correspond to a position in which the plate hole 115 is formed, and a second hole 135 may be formed in the second covering member 130 so as to correspond to the position in which the plate hole 115 is formed.

According to various embodiments disclosed in this document, there may be provided a method for manufacturing an accessory, the method including the operations of: preparing a base structure 110 including a plate 111 and a side member 112 extending from a periphery of the plate 111, a first covering member 120 made of a knit, and a second covering member 130 made of a fiber different from the material of the first covering member 120; covering the base structure 110 by the first covering member 120 such that the first covering member at least partially faces the plate 111 of the base structure 110, an outside surface of the side member 112, and an inside surface of the side member 112; coupling at least a part of the first covering member 120 to the base structure 110; cutting at least a part of (the first covering member 120; covering the base structure 110 by the second covering member 130; and coupling at least a part of the second covering member 130 to at least a part of the first covering member 120 so as to overlap the same.

According to various embodiments, the process of cutting at least a part of the first covering member 120 may include a process of press-punching at least a part of the first covering member 120 facing the front surface 111A of the plate 111.

According to various embodiments, the process of coupling at least a part of the first covering member 120 to the base structure 110 and the coupling at least a part of the second covering member 130 to at least a part of the first covering member 120 so as to overlap the same may include a hot pressing process.

According to various embodiments, in connection with the process of preparing the base structure 110, the first covering member 120, and the second covering member 130, the method may include the processes of: forming a plate hole 115 in the base structure 110; forming a first hole 125 in the first covering member 120; and forming a second hole 135 in the second covering member 130. In connection with the process of coupling at least a part of the first covering member 120 to the base structure 110, the method may include a process of aligning the plate hole 115 with the first hole 125. In connection with the process of coupling at least a part of the second covering member 130 to at least a part of the first covering member 120 so as to overlap the same, the method may include a process of aligning the plate hole 115 with the second hole 135.

According to various embodiments disclosed in this document, there may be provided an accessory attachable to/detachable from an electronic device, the accessory including: a base structure 110 including a plate 111 having a front surface 111A formed to face in a first direction and having a rear surface 111B formed to face in a second direction opposite to the first direction, and a side member 112 surrounding a space formed such that an electronic device 200 is seated on the front surface 111A; a first covering member 120 covering at least a partial surface of the base structure 110 including the rear surface 111B, the first covering member 120 including a first planar element 131 facing the rear surface 111B, a first edge element 122 facing an outside surface 111C of the side member 112, and a first hemming element 123 facing at least a part of an inside surface of the side member 112, and the first covering member 120 being made of a knit; and a second covering member 130 covering at least a partial surface of the base structure 110 including the front surface 111A, the second covering member 130 including a second planar element 131 facing the front surface 111A and a second edge element 132 formed so as to face at least a part of the inside surface of the side member 112 and to overlap at least a part of the first hemming element 123, and the second covering member 130 being made of a material different from the first covering member 120, wherein an opening 113 is formed in the side member 112 so as to correspond to a part on which an input/output device of the electronic device is formed, and a second hemming element 124 is formed integrally with the first covering member 120 so as to face at least a part of the front surface 111A and is positioned to correspond to the opening 113, the second hemming element 124 having an end abutting an end of one side of the second planar element 131.

According to various embodiments, in connection with the accessory attachable to/detachable from an electronic device, the end of one side of the second hemming element 124 and the end of one side of the second planar element 131 may have the same height.

The embodiments disclosed herein have been presented to explain the technical contents of the disclosure and help understanding thereof, and are not intended to limit the scope of the technology set forth herein. Therefore, the scope of the disclosure should be construed to include, in addition to the embodiments disclosed herein, all changes and modifications derived on the basis of the technical idea of the disclosure.

What is claimed is:

1. An accessory comprising:
   a base structure comprising a plate having a front surface formed to face in a first direction and having a rear surface formed to face in a second direction opposite to the first direction, and a side member extending from a periphery of the plate;
   a first covering member covering at least a partial surface of the base structure comprising the rear surface, the first covering member comprising a first planar element facing the rear surface, a first edge element facing an outside surface of the side member, and a first hemming element facing at least a part of an inside surface of the side member; and
   a second covering member covering at least a partial surface of the base structure comprising the front surface, the second covering member comprising a second planar element facing the front surface and a second edge element facing at least a part of the inside surface of the side member, wherein
   at least a part of the second edge element is configured to overlap at least a part of the first hemming element.

2. The accessory of claim 1, wherein the first covering member is made of a fiber comprising a knit.

3. The accessory of claim 1, wherein the second covering member is made of a material different from the first covering member.

4. The accessory of claim 1, wherein the second edge element is compressed and fixed to the first hemming element.

5. The accessory of claim 1, wherein an opening is formed through one side of the side member, and the first covering member comprises a second hemming element formed so as to face at least a part of the front surface and positioned to correspond to the opening.

6. The accessory of claim 5, wherein an end of one side of the second hemming element is configured to abut an end of one side of the second planar element.

7. The accessory of claim 6, wherein the end of one side of the second hemming element and the end of one side of the second planar element have an identical height.

8. The accessory of claim 5, wherein the second hemming element is configured to extend integrally with the first planar element.

9. The accessory of claim 5, wherein the first hemming element comprises a corner element covering at least a part of an inside corner of the side member, the corner element is connected integrally with the second hemming element, and the width by which the second edge element is overlapped onto the first edge element on the corner element gradually decreases towards the first hemming element.

10. The accessory of claim 1, wherein a gap is formed between the side member and the second edge element, and the side member is curved so as to compensate for the gap.

11. The accessory of claim 1, wherein a plate hole is formed in the base structure, a first hole is formed in the first covering member so as to correspond to a position in which the plate hole is formed, and a second hole is formed in the second covering member so as to correspond to the position in which the plate hole is formed.

12. A method for manufacturing an accessory, the method comprising:
   preparing a base structure comprising a plate and a side member extending from a periphery of the plate, a first covering member made of a knit, and a second covering member made of a material different from the first covering member;
   covering the base structure by the first covering member such that the first covering member at least partially faces the plate of the base structure, an outside surface of the side member, and an inside surface of the side member;
   coupling at least a part of the first covering member to the base structure;
   cutting at least a part of the first covering member;
   covering the base structure by the second covering member; and
   coupling at least a part of the second covering member, so as to overlap, to at least a part of the first covering member.

13. The method of claim 12, wherein the cutting at least a part of the first covering member comprises press-punching at least a part of the first covering member facing the front surface of the plate.

14. The method of claim 12, wherein the coupling at least a part of the first covering member to the base structure and the coupling at least a part of the second covering member, so as to overlap, to at least a part of the first covering member comprise hot pressing.

15. The method of claim 12, wherein, in connection with the preparing the base structure, the first covering member, and the second covering member, the method comprises:
   forming a plate hole in the base structure;
   forming a first hole in the first covering member; and
   forming a second hole in the second covering member, wherein
   the method comprises, in connection with the coupling at least a part of the first covering member to the base structure, aligning the plate hole with the first hole, and comprises, in connection with the coupling at least a part of the second covering member, so as to overlap, to at least a part of the first covering member, aligning the plate hole with the second hole.

* * * * *